United States Patent [19]

Hyner et al.

[11] Patent Number: 4,773,111

[45] Date of Patent: Sep. 27, 1988

[54] SELECTIVELY HARDENED SELF DRILLING FASTENERS AND PROCESS FOR MAKING THE SAME

[75] Inventors: Jacob Hyner, Waterbury; Steven Gradowski, Torrington, both of Conn.

[73] Assignee: Whyco Chromium Company, Inc., Thomaston, Conn.

[21] Appl. No.: 137,059

[22] Filed: Dec. 23, 1987

Related U.S. Application Data

[62] Division of Ser. No. 930,007, Nov. 12, 1986, Pat. No. 4,730,970.

[51] Int. Cl.⁴ .............................................. B23G 9/00
[52] U.S. Cl. ................................................... 10/10 R
[58] Field of Search ................... 10/10 R, 10 P, 27 R; 407/119; 408/144, 200; 411/82, 258, 386, 387, 900–903, 907, 908; 148/147

[56] References Cited

U.S. PATENT DOCUMENTS

| | | | |
|---|---|---|---|
| 667,555 | 2/1901 | McGahan | 411/903 X |
| 1,299,232 | 4/1919 | Rosenberg | 411/436 X |
| 1,717,388 | 6/1929 | Keeler | 10/10 R |
| 2,122,915 | 7/1938 | Olson | 411/386 |
| 2,712,261 | 7/1955 | Anderson | 411/487 |
| 3,355,205 | 11/1967 | Wagner et al. | 411/387 X |
| 3,884,116 | 5/1975 | Hage | 411/387 |
| 3,936,366 | 2/1976 | Green | 427/96 X |
| 3,948,739 | 4/1976 | Chaudhari et al. | 427/36 X |
| 3,989,610 | 11/1976 | Tsukada et al. | 427/54.1 X |
| 4,091,173 | 5/1978 | Hage | 411/914 |
| 4,188,459 | 2/1980 | Hyner et al. | 427/406 X |
| 4,203,690 | 5/1980 | Tanaka et al. | 407/119 |
| 4,395,173 | 7/1983 | Sygnator | 411/387 |

FOREIGN PATENT DOCUMENTS

| | | | |
|---|---|---|---|
| 26071 | 1/1913 | United Kingdom | 411/902 |
| 811573 | 4/1959 | United Kingdom | 411/902 |
| 1204853 | 9/1970 | United Kingdom | 411/386 |

*Primary Examiner*—E. Michael Combs
*Attorney, Agent, or Firm*—DeLio & Associates

[57] ABSTRACT

A process for making self-threading screw fasteners wherein only the cutting portions of the tip of the fasteners are hardened. The unhardened portions of the fastener remain ductile and are not subject to hydrogen embrittlement during subsequent plating to improve corrosion resistance. The process preferably comprises applying a radiation curable plastic coating over the drill tip followed by plating of a thin (minimum 0.0005 inch, 0.013 mm) layer of copper. The cured coating is then removed leaving an unplated tip. The screw is then subjected to a hardening process, wherein only the portions of the screw without the copper layer are hardened. The screw may then be plated conventionally with a corrosion resistant metal. The invention is further directed to the product of the process. A second embodiment for making screws suitable for extreme corrosion resistance is also described.

11 Claims, 1 Drawing Sheet

SELECTIVELY HARDENED SELF DRILLING FASTENERS AND PROCESS FOR MAKING THE SAME

This is a divisional of co-pending application Ser. No. 930,007 filed on Nov. 12, 1986 U.S. Pat. No. 4,730,970.

BACKGROUND OF THE INVENTION

This invention relates to a process for making screw fasteners and more particularly to a process for making plated, self-drilling screws where only selected portions of the screws have been hardened. The invention also relates to the product resulting from the selective hardening process.

There are a number of industrial applications where it is necessary to mount a relatively thin panel onto a member of an underlying frame. Among these are the mounting of body panels to the frame of an automobile, curtain walls to the structure of a building and paneling intended for use with large home appliances such as dishwashers and automatic washing machines. In these applications and many others, such mounting is accomplished with screw fasteners.

In many operations where screws are used as fasteners, it is a practice to pre-drill and thread pilot holes to receive them. Where the structure is simple and the surfaces are readily accessible, such a practice does not impose much of an economic penalty. However, where the structure is more complex as on an automobile assembly line, or involves field work, as in automobile body shop work or in the building trades, the necessary tooling can be quite complicated and using such tooling can impose considerable time and cost penalties.

To simplify such work, self-drilling, screws are often used. These screws have the tip area configured as a drill point so that they can drill and tap their own pilot holes, thus offering a considerable reduction in assembly time.

In order to perform the drilling and tapping function the cutting surfaces of the screws must be harder than the work material. Typically the screws have been formed of steel which is subsequently hardened. The hardening operation can be completed in any one of several standard production methods, e.g. nitriding in a furnace with a controlled atmosphere, cyanide hardening in pots and Shaker hearth and quench.

By far, the majority of thread forming fasteners are hardened in bulk in rotary furnaces with a controlled nitrogen atmosphere. This results in a fastener which is hardened over its entire surface even though only the drill tip and first few threads of the screw do all the actual cutting.

Many of the above applications for self drilling, self threading screws involve long-term exposure to corrosive environments, so the process for making ferrous metal screws, in particular, customarily includes the step of plating the screws with a corrosion resistant metal layer after the hardening operation. The corrosion resistant layer may include one or more layers of electrodeposited copper, nickel and/or chromium and the like.

Unfortunately, when hardened steel is electroplated with the corrosion resistant layer it becomes much more brittle through a process called "hydrogen embrittlement". A fastener which has been hydrogen embrittled has a greatly increased risk of cracking at the head or shank when driven or torqued during assembly. Soft steel, however, is not hydrogen embrittled during the plating process.

In order to relieve the hydrogen embrittlement and reduce the danger of cracking the fastener during installation, standard specifications call for the fastener to be heat treated for several hours at 400° F. immediately after electroplating of the corrosion resistant layers. Such post-plating heat treatment is not always completely successful at relieving the hydrogen embrittlement. A more certain method of preventing hydrogen embrittlement is needed.

SUMMARY OF THE INVENTION

The present invention relates to a process for making a screw fastener where only the tip area and first few threads of the screw are hardened. The head and shank are not hardened and remain tough, ductile and not subject to hydrogen embrittlement during subsequent plating operations.

The process comprises applying a coating to the tip of a soft steel screw fastener covering only the tip area and first few threads. The screw is then plated with a thin (minimum approximately 0.0005 inches or 0.013 mm) layer of copper.

The tip coating is then removed leaving the tip portion of the screw free of the copper plating. The screw is then subjected to the hardening process. The copper layer prevents hardening of the upper shank and head, leaving only a hardened tip area consisting of the screw tip and first few cutting threads of the screw.

The fastener is then plated conventionally with one or more corrosion resistant metals. The upper shank and head are not subject to hydrogen embrittlement during the final plating steps because they were never hardened. Experience in the field has determined that hydrogen embrittlement of the tip area is not a problem.

In the preferred embodiment, the tip coating is a radiation cured polymer resin which cures to a hard frangible coating. The method is particularly suitable for self drilling screws where the tip area is configured as a drill tip.

A method of adjusting the adhesion of the coating with a commercial phosphate pre-coating compound is described.

In a second embodiment, a method for producing an extremely corrosion resistant screw is described. In this second embodiment, the tip coating is reapplied after the hardening process but before the plating of the corrosion resistant layer so as to prevent dulling of the cutting edges by the thickness of the corrosion resistant plated layer.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the invention, reference is had to the following description taken in connection with the accompanying drawings.

DETAILED DESCRIPTION OF THE PREFERRED EMBODIMENT

Figure 1:
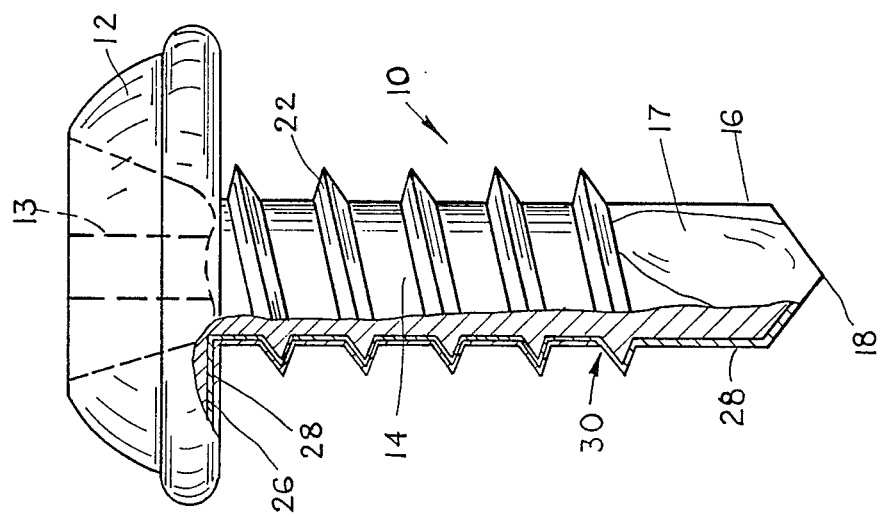
FIG. 1 is a front elevational view of the screw fastener as it appears at an intermediate step during production showing the coating on the tip and the copper plating layer.

FIG. 1 is an enlarged front view of an exemplary self-drilling screw 10 comprising a head 12, which is customarily impressed with either a lateral or crossed (Phillips head) slot 13 to facilitate engaging and driving the screw. The screw 10 also comprises a threaded shank 14, which may be either cylindrical or conical, and a tip area 16. In the preferred embodiment, tip area 16 is configured as a drill comprising a pair of flutes 17 and a drill point 18.

When the screw 10 is driven into the work surface, the sharp point and cutting flutes of the tip area 16 cut into the softer work surface. As the screw penetrates into the work material, the first threads 20 cut threads into the work. This process continues with the upper threads 22 on the screw following the cutting threads 20 until the screw is fully seated. The upper threads 22 are substantially non-cutting threads.

In order for the tip 16 and threads 20 to cut properly, they must be hardened. However, the remainder of the screw does not require hardening since it performs no cutting function. Indeed, there are significant advantages in leaving the remainder of the screw unhardened, soft and ductile. With the upper portions of the screw unhardened, stresses are distributed more evenly during driving and the cracking problems associated with hydrogen embrittlement are avoided.

The process of this invention results in a screw 10 which has been hardened only at the tip. Following hardening of the tip, the screw is completely plated for corrosion resistance. Conventional corrosion resistance electroplating is employed.

The process of this invention begins with the formation of a steel screw 10. The head 12, slot 13, drill tip 16, flutes 17, drill point 18 and threads 20, 22 are all formed at this time with conventional production methods. At this point, the screw is entirely formed of soft steel, and, consequently, is incapable of performing the self drilling function until after hardening. Steels such as SAE 1019 and SAE 1022 are particularly suitable for the steel screws of this invention.

Following the forming operation, the drill tip area 16 and the cutting threads 20 are covered with a tip coating 24. For a screw type such as that depicted in FIG. 1, the first one or two threads do all the cutting and are considered the cutting threads 20. FIG. 1 shows approximately one and one half threads 20 covered with the tip coating compound 24.

In the preferred embodiment, the tip coating 24 is a radiation curable polymer compound. A number of radiation curable polymer coating materials suitable for this purpose have been developed and are commercially available. Typical of these are compounds described by Green in U.S. Pat. No. 3,936,366 Chaudhari et al, in U.S. Pat. No. 3,948,739 and Tsukada et al., in U.S. Pat. No. 3,989,610. All of these materials are capable, upon being exposed to a beam of actinic or ionizing radiation of a proper wavelength and intensity, of curing to a solid plastic in a matter of a few seconds at most. Some will even cure in fractions of a second. Of these, UV curable resins such as triallyl cyanurate are preferred. By controlling the thickness of such resins to be between about 0.01 (0.25 mm) and about 0.1 (2.54 mm) inches, the cured coating is found to be frangible so that under proper conditions it will break off cleanly. Chemical removal is also feasible with the use of other types of coating materials.

For a high speed operation such as that involved in producing the screws of the present invention, a quick-curing resin is required. A preferred curing time for the polymer compound is 2 seconds or less. Ultraviolet generation equipment suitable to cure a UV curable coating within 2 seconds is readily available. When so cured, UV curable coating 24 is hard, frangible and relatively acid and solvent resistant with good adhesion.

With the coating 24 applied to the tip of the screw, the screw is plated with a thin layer of copper 26. The function of the copper layer 26 is to prevent hardening of the copper plated portions of the screw during subsequent hardening operations. It is well known that only a thin layer of copper is required to prevent the hardening. Typically, a layer of copper with a minimum thickness of 0.0005 inches (approximately 0.013 mm) is sufficient to prevent hardening of the underlying steel.

The coating 24 prevents deposition of the copper 26 on the tip area 16 and the cutting threads 20. Following the copper plating, the plastic coating is removed. The radiation curable coatings are frangible and may be removed mechanically by impact or with a steel brush, etc. Other coatings may be removed by suitable chemical solvents.

Plastic coatings of the type described easily withstand the stresses involved in the copper plating operation.

Where necessary, adhesion of the coating 24 can be adjusted by cleaning tip 16 and threads 20 to remove cutting oil, grease and other contamination and then "roughening" with a commercial phosphate pre-coating compound, such as that provided by the Detrex Chemical Company under the trade name "1020-CN", before the resin coating is applied. Such roughening may also be provided by mechanical means such as sanding or grinding, but chemical treatment is preferred.

Optimum adjustment of the adhesion characteristics permit the coating 24 to remain intact throughout the copper plating operation, but allow easy removal prior to the hardening operation.

With the plastic coating 24 removed, the screw 10 is left with copper plating only on the upper non-cutting surfaces. The screw is then hardened, preferably in bulk in a rotary furnace with a controlled nitrogen atmosphere. Since the cutting surfaces 16, 17, 18, 20 are all free of the copper plating 26, they are hardened normally. The upper non-cutting surfaces are protected by the copper plating 26 and are not hardened.

Figure 2:
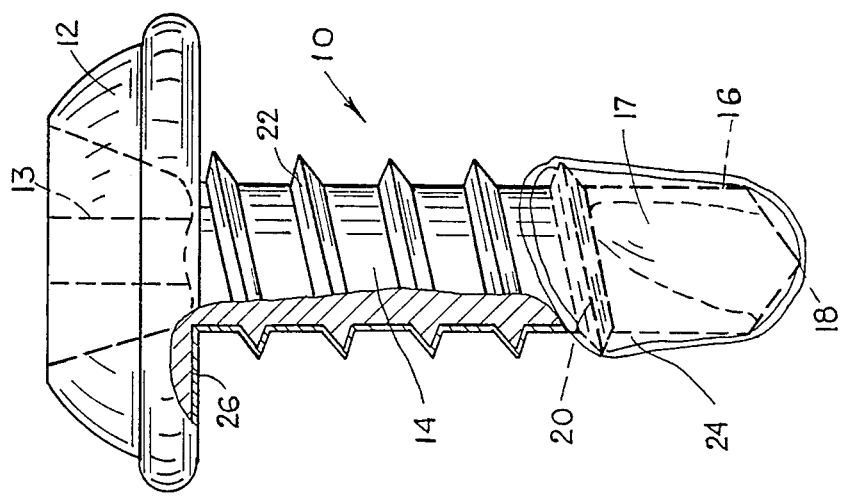
FIG. 2 is a front elevational view of the finished screw fastener with the final corrosion resistant plating layer applied.

Following hardening, the screws are plated with a corrosion resistant plating 28 such as copper, nickel, chromium or combinations thereof. The corrosion resistant plating covers the entire screw as shown in FIG. 2. The cutaway in FIG. 2 shows the two plated layers consisting of a lower copper layer 26 and a surface corrosion resistant layer 28.

The lower half of the cutaway in FIG. 2 shows the transition zone 30 between the hardened steel without the copper layer 26 and the unhardened steel with both the copper layer 26 and the corrosion resistant layer 28.

The corrosion resistant layer 28 may actually be a multilayer construction rather than the single layer shown in FIG. 2. Also, the relative thickness of the layers is not shown to scale.

Because the upper non-cutting surfaces are not hardened, there is no danger of hydrogen embrittlement of these areas. The head 12, shank 14 and upper threads 22 all remain strong and ductile and there is very little danger of breakage or cracking when the screw is driven or torqued into place.

Experience in the field has shown that hydrogen embrittlement of the tip area is not a problem. Consequently, there is no need to heat treat the finished screws. Once the screw has drilled and cut the threads, the tip area 16 provides neither strength nor appearance to the final product. In contrast, the head and shank must be intact to provide both strength and an acceptable appearance.

In a screw which is hydrogen embrittled at the head and shank, even minute cracks can lead to premature failure, poor appearance or provide a center for corrosion to begin.

No special processing equipment is needed to produce the resin coatings described here. Conventional processing equipment can be used to clean and phosphate precoat the screw in bulk, and standard vibratory feeders can be readily adapted to allow the screw tips to pass through pans or trays containing the plastic resin coating material. The thickness of the resin coating applied will depend on such factors as the time of travel through the resin and resin viscosity. Subsequent electroplating is also carried out by normal process techniques.

Where screw 10 is intended for service in extremely corrosive environments, the finished screw may be plated with a metal ranging in thickness from about 0.001 (0.025 mm) to about 0.003 inches (0.076 mm). In such instances the plating may be derived from a "system" comprised of a multiplicity of layers to impart particular enhanced corrosion resistant characteristics to the plated part. One such "system" is described in U.S. Pat. No. 4,188,459 issued to Hyner et al, which is incorporated by reference herein.

The plating described therein comprises depositing over a ferrous metal substrate, in sequence, a first layer of an alloy which has a micro-throwing power, a second layer of cadmium, cadmium-tin alloy, a dual layer of cadmium and tin, zinc or a zinc alloy, a third layer of copper, a fourth layer of nickel and a final layer of chromium or a metallic chromium-substitute. In this system the micro-throwing layer is either nickel-cadmium, cobalt-zinc or a ternary or quaternary alloy containing iron, nickel or cobalt in combination with cadmium and/or zinc. Other plating systems capable of applying such heavy electro-deposits to threaded fasteners are commercially available and the present invention is not limited as to which of these may be used.

Where heavy corrosion resistant layers are applied in the range of 0.003 inches (0.076 mm), the sharpness of the cutting edges of the screw is degraded significantly by excess buildup of the plating at the sharp edges. United States patent application Ser. No. 808,514 filed Dec. 13, 1985 describes a process for using radiation cured plastics to protect the tip of a self-drilling screw from dulling during the plating of a heavy corrosion resistance layer.

In a second embodiment of the invention, the frangible plastic coating 24 can be reapplied after the hardening operation is complete. This embodiment is particularly desirable when extreme corrosion resistance is required and when thick corrosion resistant layers are applied such as are described above.

The equipment used to apply the plastic coating of the present invention may also be used to reapply the same type of coating after hardening of the steel screw, but before the corrosion resistant layer is plated in accordance with the description in U.S. patent application Ser. No. 808,514. This optional final plastic coating protects the sharp and hardened cutting edges of the screw during plating of the corrosion layer and through subsequent shipping and handling of the screw.

In this second embodiment, the screw is shipped with the frangible coating layer still attached. The screws are used with the coating still applied however, under the initial pressure of the drilling operation, the coating quickly shatters, exposing the sharp cutting edges of the screw.

It will thus be seen that the objects set forth above, among those made apparent from the preceding description are efficiently attained and, since certain changes may be made in carrying out the above method and in the article set forth without departing from the spirit and scope of the invention, it is intended that all matter contained in the above description and shown in the accompanying drawing shall be interpreted as illustrative and not in a limiting sense.

We claim:

1. A process for making a screw fastener having a tip area configured as a drill point with hardened cutting surfaces, an unhardened head area, and an screw shank area having a first portion carrying hardened cutting threads proximate to the drill point, and a second portion carrying unhardened non-cutting threads proximate to said cutting threads comprising the steps of:
   (a) applying a quick curing coating over only the tip area and cutting threads;
   (b) curing said coating to form a protective layer on said tip area and cutting threads;
   (c) after step (a) and (b) plating the remaining uncoated surfaces of said screw fastener with copper;
   (d) removing the coating from the unplated tip area and cutting threads; and
   (e) after step (d) subjecting only the unplated tip area and cutting threads to a hardening operation.

2. The process of claim 1 further comprising the step of plating the screw fastener with a further layer of a corrosion resistant metal after step (e).

3. The process of claim 1 further comprising the steps of cleaning the screw and roughening the tip area prior to applying the coating.

4. The process of claim 3 wherein said roughening step is performed by chemically applying to said tip area a phosphate pre-coating compound.

5. The process of claim 1 wherein said coating is a resin coating selected from the class consisting of UV curable resins, IR curable resins and ion beam curable resins.

6. The process of claim 5 wherein the thickness of the cured resin coating is between about 0.01 inches (0.25 mm) and about 0.10 inches (2.5 mm).

7. The process of claim 5 wherein curing is accomplished by exposing the resin to ultraviolet light of a sufficient intensity so that it will cure to form a solid frangible plastic coating in about 2 seconds or less.

8. The process of claim 1 wherein the thickness of the copper coating is at least 0.0005 inches (0.013 mm).

9. The process of claim 1 further including the steps of reapplying the quick curing coating to the tip area and curing said coating after step (e).

10. The process of claim 9 further including the step of electroplating a corrosion resistant metal onto the entire surface of the screw after said reapplying step.

11. The process of claim 10 wherein the thickness of the corrosion resistant metal is between about 0.001 and 0.003 inches (0.025 and 0.076 mm).

* * * * *